Feb. 2, 1960    M. WAGNER    2,923,866
ELECTROLYTIC CONDENSER
Filed Jan. 11, 1956
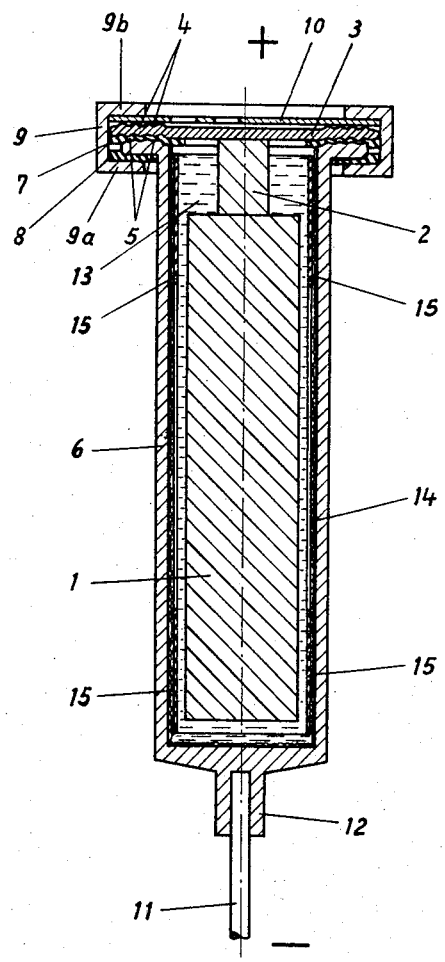
INVENTOR
M. WAGNER
BY *R.P. Morris*
ATTORNEY United States Patent Office 2,923,866
Patented Feb. 2, 1960

2,923,866

ELECTROLYTIC CONDENSER

Manfred Wagner, Nurnberg, Germany, assignor to International Standard Electric Corporation, New York, N.Y., a corporation of Delaware Application January 11, 1956, Serial No. 558,562

Claims priority, application Germany February 18, 1955

4 Claims. (Cl. 317—230)

The invention relates to an electrolytic condenser, and particularly to enlarging the surface of the cathode of such a condenser.

The capacity of electrolytic condensers, as is well-known, can be increased by increasing the surface of the electrodes. A considerable progress in this direction was made by the development of tantalum-type electrolytic condensers, in which fine tantalum powder is pressed and processed to form a porous sinter body, so that the operating electrolyte contacts an extremely large surface of the electrode. The dielectric of this condenser is formed by a thin film of tantalum oxide with which the sinter body is coated, while the container of the electrolyte consists of a non-corrosive material, preferably of silver, which acts as the cathode. The capacity, which is achievable when employing this type of embodiment, and which is large for a small space, results in increased current density and internal resistance between the electrolyte and the cathode. It is therefore necessary, to enlarge the surface of the anode carrier as well as the cathode surface. The methods which were hitherto known for achieving this purpose, such as mechanical roughening by means of file cuttings, sand blasts, or the like, and the chemical roughening by means of etching processes which were carried out in an acid bath, have proved to be insufficient. Also the precipitation of common metals, such as copper, aluminum, or the like, as well as coatings of graphite were incapable of bringing about any substantial reductions in the current heat losses of the condenser.

According to the invention the surfaces of the casing, which act as the cathode, and which are in contact with the electrolyte, are first roughened and then coated with a layer of spongy rare metal (noble metal), such as spongy platinum or spongy palladium, or mixtures of these and other spongy noble metals. This can be accomplished in the conventional manner by means of an electrolytic precipitation. In this connection spongy platinum has proved to be particularly suitable because it consists of the most finely distributed platinum and is capable of forming an extremely porous coating, so that the surface of the cathode, which is in contact with the electrolyte, is substantially enlarged compared with the rest of the casing. By means of this enlargement in the contacting surface between the electrolyte and the cathode, the internal resistance is substantially reduced and the current density is reduced to the surface unit of the cathode, thus preventing damage due to the heating-up of the electrolyte. Another advantage in the employment of spongy platinum resides in the fact that it, on account of its noble metal character is not chemically attacked by the electrolyte. Further, an important property of spongy platinum is that it, by acting as a catalyst, reunites the hydrogen and oxygen, which are produced during the operation, to form water so that the composition of the electrolyte practically suffers no change after long use.

In the accompanying drawing there is shown one embodiment of the invention. In this drawing, 1 denotes the sinter body, connected to the electrode lead 2 which serves as a holding element for a plate 3 welded thereto; the plate being of tantalum and serving as the cover. This plate is provided with concentric, ring-shaped impressions 4 that engage the correspondingly arranged impressions 5 of the flange of the condenser casing 6. As packings there are used two rings 7 and 8. The sealing cover 9 holds together the individual packing components. The contact-making may be effected with the aid of a ring 10 that may be provided with a soldering lug. The connecting wire 11 for the electrolyte casing which is designed as the minus pole, is wedged into a projection 12 arranged at the bottom. The container or casing is filled with the electrolyte 13, whose contacting surface with the cathode is substantially enlarged by means of the coating of spongy platinum 14. The insulating layer 15 serves as a protection against electric contact and against a short-circuit between the sinter body, which is designed as the anode, and the condenser casing.

The invention, however, is in no way restricted to the example described, but may be employed with electrolytic condensers in which, instead of the casing, a non-formed electrode is designed as minus pole and which, for the purpose of reducing the loss factor, is coated with a layer of spongy noble metal.

What is claimed is:

1. An electrolytic condenser in which one electrode only has been subjected to the forming process, comprising a casing adapted to act as the other electrode, and means for enlarging the surface of said other electrode which is in contact with the electrolyte, said means comprising a coating of spongy noble metal on the parts of said other electrode which are in contact with the electrolyte, said noble metal comprising one of the noble metals of the group consisting of platinum and palladium.

2. An electrolytic condenser, as claimed in claim 1, in which the spongy noble metal is spongy platinum.

3. An electrolytic condenser, as claimed in claim 1, in which the surface of the electrode carrying the spongy noble metal is roughened before the spongy noble metal is applied thereto.

4. An electrolytic condenser, as in claim 1, in which the spongy noble metal is a mixture of spongy platinum, spongy palladium and of another spongy noble metal.

References Cited in the file of this patent

UNITED STATES PATENTS

| 1,647,649 | Morrison | Nov. 1, 1927 |
| 2,104,019 | Brennan | Jan. 4, 1938 |
| 2,368,688 | Taylor | Feb. 6, 1945 |
| 2,617,863 | Stinson | Nov. 11, 1952 |

Notice of Adverse Decision in Interference

In Interference No. 91,839 involving Patent No. 2,923,866, M. Wagner, Electrolytic condenser, final judgment adverse to the patentee was rendered Sept. 6, 1962, as to claims 1 and 2.

[*Official Gazette January 29, 1963.*]